United States Patent [19]
Wally, Jr. et al.

[11] Patent Number: 5,036,355
[45] Date of Patent: Jul. 30, 1991

[54] METHOD AND APPARATUS FOR LOCATING COPY ON A CAMERA SUBJECT HOLDER

[76] Inventors: Joseph H. Wally, Jr., 11517 Conser, Overland Park, Kans. 66210; Arlen C. Elkins, 7225 Pennsylvania Ave., Kansas City, Mo. 64114; Ron L. Halsey, 4115 Castleford Dr., Colfax, N.C. 27235; Herbert W. Pace, 510 W. 5th St., Kansas City, Mo. 64105

[21] Appl. No.: 561,884
[22] Filed: Aug. 2, 1990
[51] Int. Cl.⁵ ............................................. G03B 27/62
[52] U.S. Cl. ......................................... 355/75; 355/40
[58] Field of Search ................................... 355/75, 40

[56] References Cited
U.S. PATENT DOCUMENTS

| | | |
|---|---|---|
| 2,739,505 | 3/1956 | Gillette . |
| 3,635,558 | 1/1972 | Le Peer et al. ........................ 355/75 |
| 3,683,779 | 8/1972 | Lifton ................................... 355/40 |
| 4,705,390 | 11/1987 | Kasahara et al. ...................... 355/75 |
| 4,862,223 | 8/1989 | Yamashita . |
| 4,980,781 | 12/1990 | Yamamoto et al. ................... 355/75 |

Primary Examiner—Monroe H. Hayes
Attorney, Agent, or Firm—Kokjer, Kircher, Bradley, Wharton, Bowman & Johnson

[57] ABSTRACT

An auxiliary camera/projector is mounted on one side of an automatic step-and-repeat camera to obtain a template film image and project it onto the subject holder to provide a visual guide for properly positioning copy which is to be photographed by the step-and-repeat camera. The auxiliary unit has a film holder which latches into place and which includes removable opaque panels in front of and behind the film. When the camera/projector is being used to photograph the template, the front panel is removed for exposure of the film to the template image. After the exposed film has been processed, the film holder is replaced in the camera/projector and both opaque panels are removed for projection of light through the film and onto the subject holder.

11 Claims, 7 Drawing Sheets

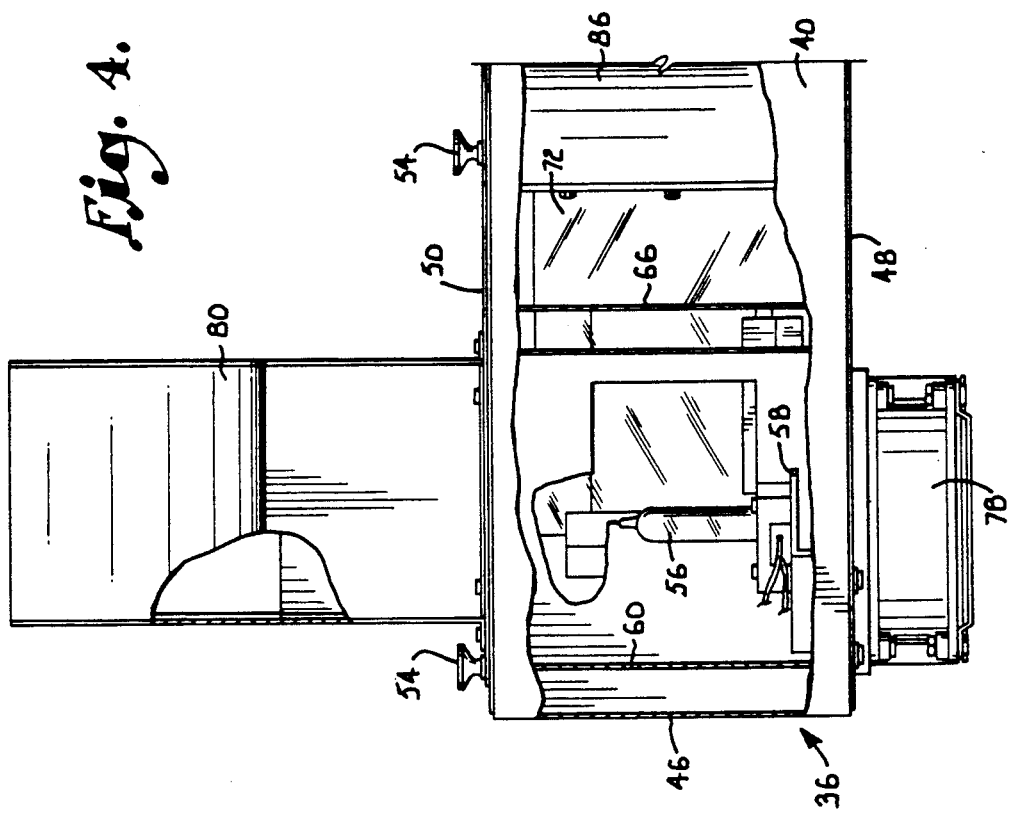
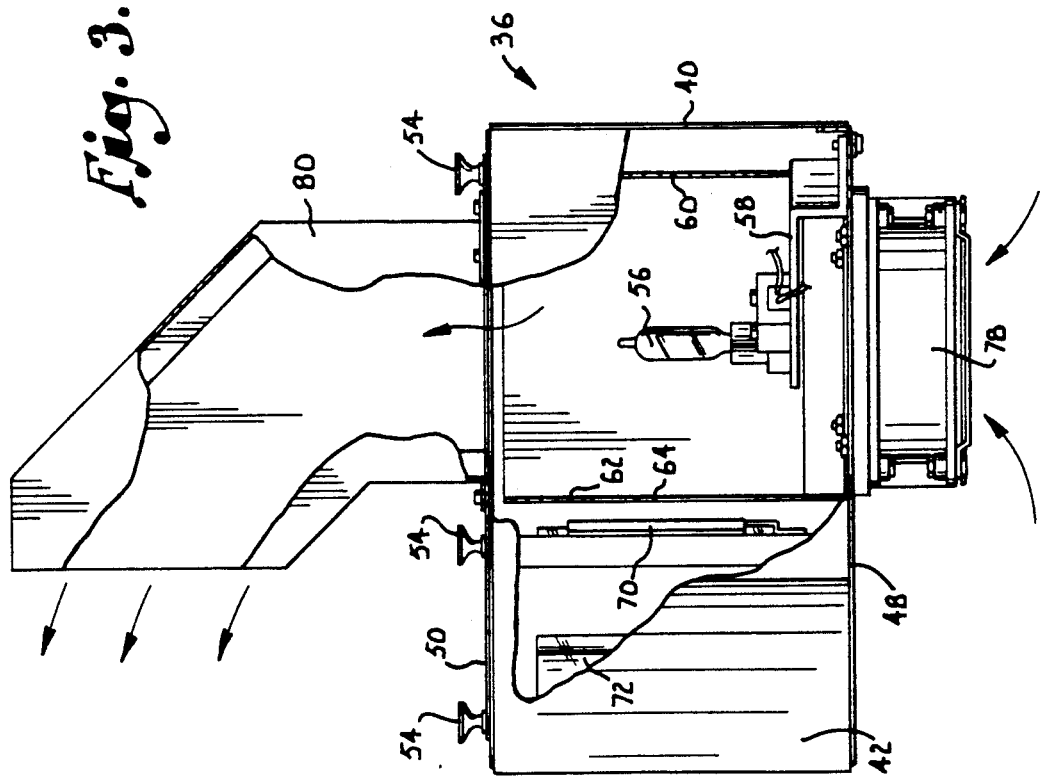

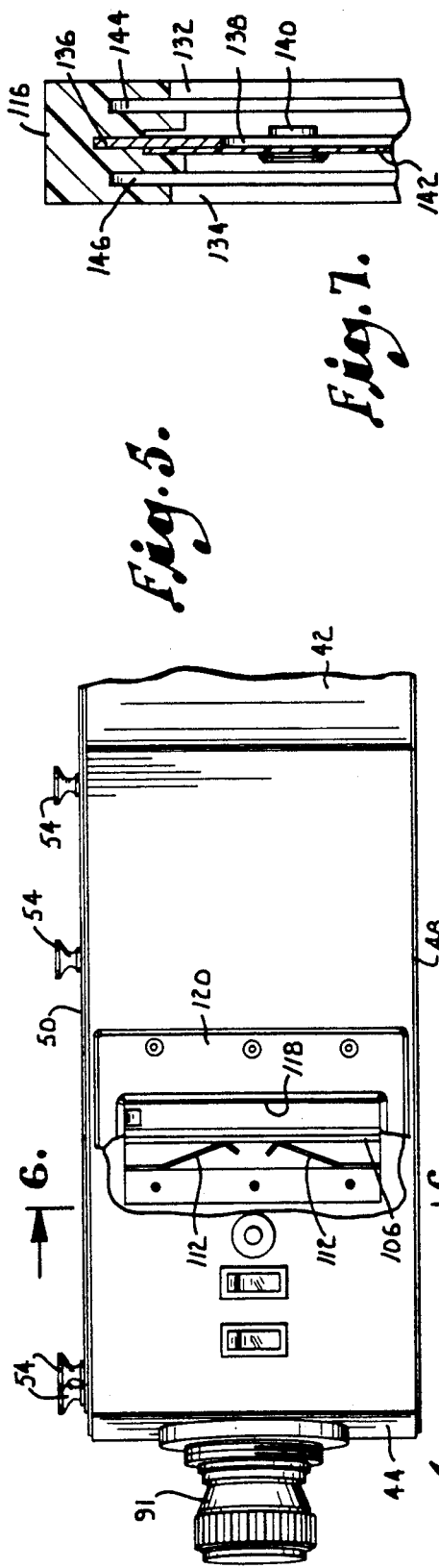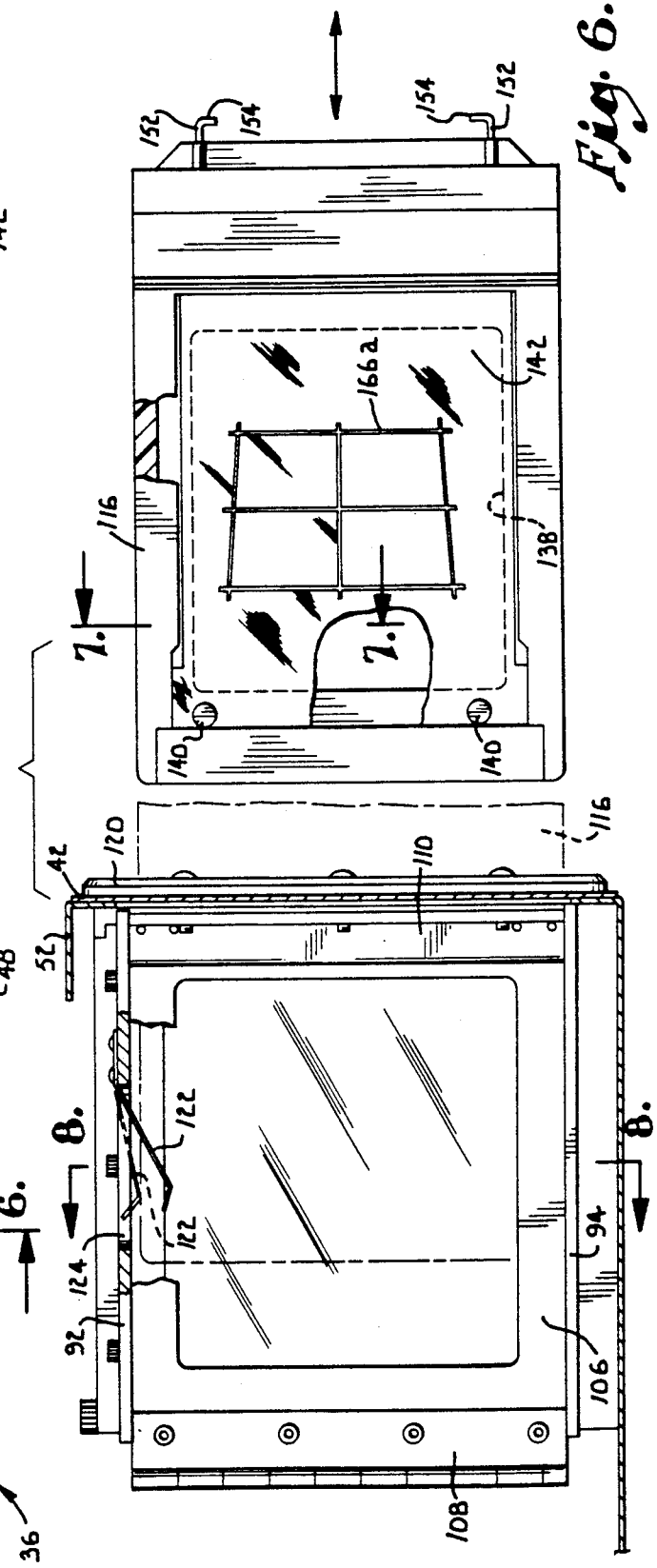

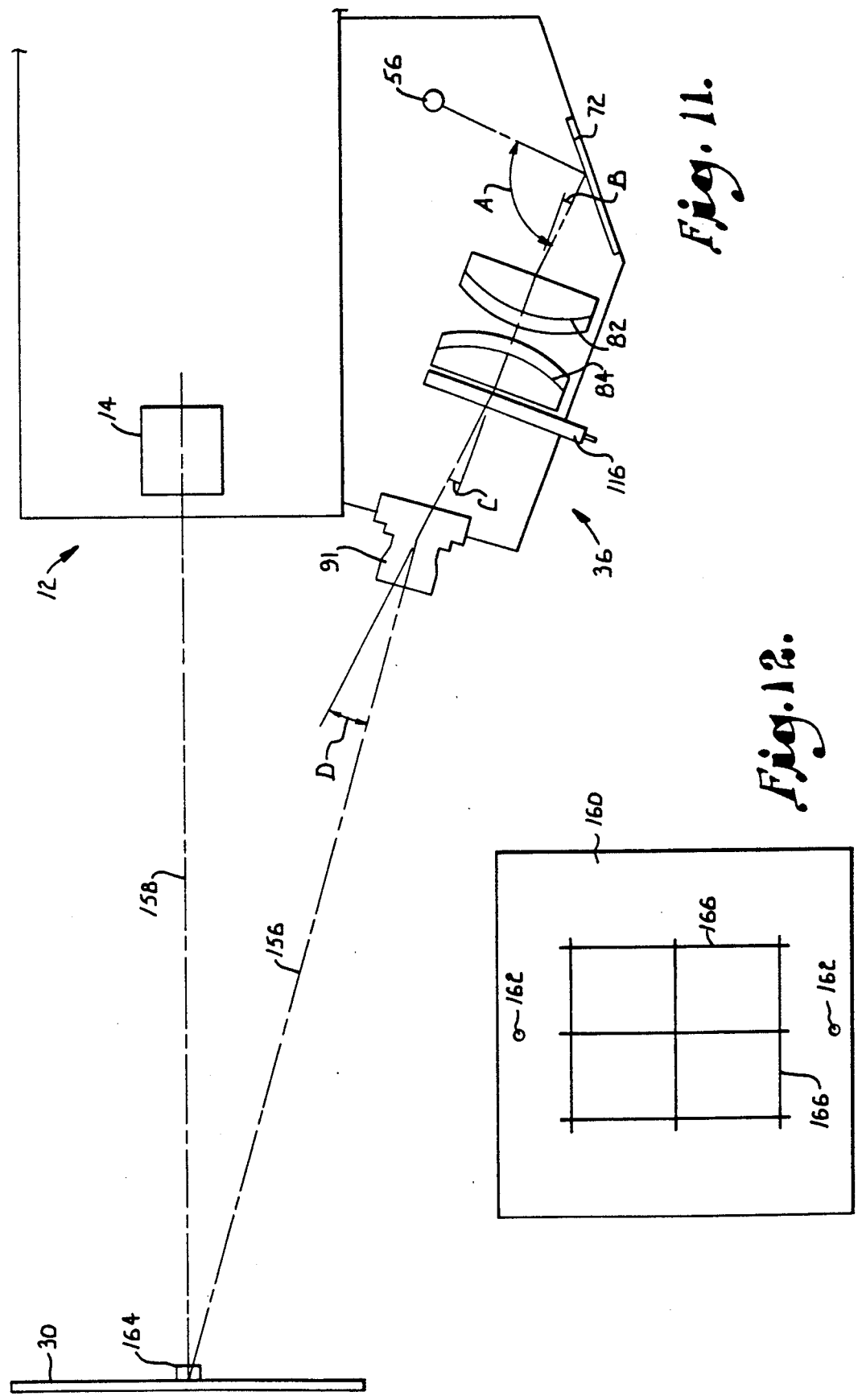

METHOD AND APPARATUS FOR LOCATING COPY ON A CAMERA SUBJECT HOLDER

BACKGROUND OF THE INVENTION

This invention relates generally to prepress photography and more particularly to an improved method and apparatus for accurately positioning copy which is to be photoreproduced by a step-and-repeat camera.

Prepress photography often involves photo reproduction of a large number of originals which have a common size and shape. For example, book pages are frequently photographed in a step-and-repeat mode in order to produce a large number of copies of the book.

Modern step-and-repeat cameras of the type shown in U.S. Pat. Nos. 3,998,546 and 4,582,406 to Wally are normally used in this type of prepress operation. Such cameras can produce an image of an 8 page film "flat" in about 1 ½ minutes with every image on the film flat in an accurate position ready for plating. High production rates are essential from an economic standpoint, and it is common practice for successive pages to be photographed every 15 seconds. If the pages are not large or difficult to handle for some other reason, the average interval for filming successive pages can be as low as 10 seconds. Each cycle requires the operator to load a sheet of copy on the subject holder, stand aside during its exposure, retrieve the copy from the subject holder after exposure, stack the copy on other copy sheets, secure the next sheet of copy, and prepare to load it on the subject holder.

In the past, the practice has been to accurately position the original copy on the subject holder through the use of registration pins which project from the holder. The copy is provided with punched holes which are located on the top and bottom margins outside of the part of the copy that is to be photographed. The punched holes are located such that when applied to the registration pins, the copy is accurately located on the subject holder to be photographed by the step-and-repeat camera.

The hole punching operation is carried out ahead of time, usually off-line in an area of the prepress department located near the camera. Typically, a two-headed pneumatic punch is used for punching of the registration holes. An operator slides the copy which is to be punched beneath a film positive that rests on a light box and is fastened to the box along its top edge. The film positive has boundaries which define the edges of the type or other features that inform the operator where the original must be located and how it must be oriented while the holes are punched. After the copy has been properly positioned using the film positive as a guide, a footswitch is triggered to activate the punch.

Because the operator must rely on "eyeballing" for proper location of the copy, considerable care must be exercised by the operator in order to achieve the necessary accuracy. If the operator is careless or lacking in skill, the lines of type can be skewed or the margins can be unduly wide or narrow. Aside from possible inaccuracies, this procedure is characterized by considerable time requirements o the part of relatively highly skilled workers. Punching of the film can actually require almost as much time as the photographic process itself.

It is also noteworthy that a major part of the book printing industry involves duplication of old volumes that are no longer in print. Such volumes may be valuable and/or fragile. In order to film the individual pages, it is necessary to remove the binding so that each page is then loose. If the margins of the pages are narrow, as is often the case, it is not possible for registration holes to be punched due to space limitations. Each page must then be taped or glued to a larger carrier sheet and the carrier sheet must then be punched near its margins. The opposite sides of the pages cannot be photographed without removing the copy sheets from the carrier sheets, reversing them and remounting them on new carrier sheets.

As can easily be appreciated, this procedure is highly labor intensive. In addition, the fragile pages of old volumes often cannot withstand as much handling as this requires without being damaged or even destroyed.

Accordingly, it is evident that there is a need to eliminate the necessity for copy to be punched in order to provide the potential for drastically cutting both labor cost and production time.

SUMMARY OF THE INVENTION

The present invention is directed to a method and apparatus for accurately positioning photographic copy on a subject holder without requiring registration holes to be punched in the copy. In accordance with the invention, an auxiliary camera/ projector is secured to the side of a main step-and-repeat camera and pointed at the copy holder. A template which defines the borders of the copy is precisely mounted on the subject holder on registration pins and is photographed by the auxiliary camera/ projector. The exposed film is processed and then inserted again into the camera/projector which is then operated in a projection mode to project the film image of the template onto the subject holder. The projected image of the template may be used by the operator as a visual guide for properly and accurately locating the copy which is to be photographed by the step-and-repeat camera. This allows the copy to be precisely positioned on the subject holder and held in place by vacuum without the need for punching registration holes in the copy. Accordingly, the time and labor required for the hole punching operation are eliminated.

The invention is further characterized by the provision of a film holder which is uniquely constructed to assure that the film is always at the same position in the auxiliary camera/ projector. The film holder has registration pins for securing the film in it at a fixed and repeatable location, and the film holder itself is latched in the camera/projector in registration with the copy that is positioned on the film holder. This assures that the projected template image accurately indicates the copy position.

Additionally, the film holder has removable opaque panels in front of and behind the film. When the film holder is removed from the camera/projector, both panels are in place to maintain the film in a light tight condition. When the film is being exposed to the template, the front panel is removed to expose the film from the front. When the film image is being projected onto the subject holder, both panels are removed so that light can be projected through the film. In this manner, the film holder assures registration of the projected film image and at the same time allows for convenient exposure of the film and subsequent projection of the film image onto the subject holder.

DESCRIPTION OF THE DRAWINGS

In the accompanying drawings which form a part of the specification and are to be read in conjunction therewith and in which like reference numerals are used to indicate like parts in the various views:

FIG. 3 is an end elevational view of the camera/projector taken from the right end of FIG. 2, with portions broken away for purposes of illustration;

FIG. 4 is a side elevational view of the camera/projector taken from the right side of FIG. 3, with portions broken away for purposes of illustration;

FIG. 5 is a fragmentary side elevational view of the camera/projector taken from the side opposite that of FIG. 4, with portions broken away for purposes of illustration;

FIG. 6 is a fragmentary sectional view taken generally along line 6—6 of FIG. 5 in the direction of the arrows and illustrating the manner of insertion and removal of the film holder into and out of the film compartment of the camera/projector;

FIG. 7 is a fragmentary sectional view on an enlarged scale taken through the film holder generally along line 7—7 of FIG. 6 in the direction of the arrows;

FIG. 11 is a schematic diagram showing the light paths for the main and auxiliary cameras;

FIG. 12 is an elevational view of a template which is photographed and then projected onto the subject holder in accordance with the present invention;

DETAILED DESCRIPTION OF THE INVENTION

Figure 1:
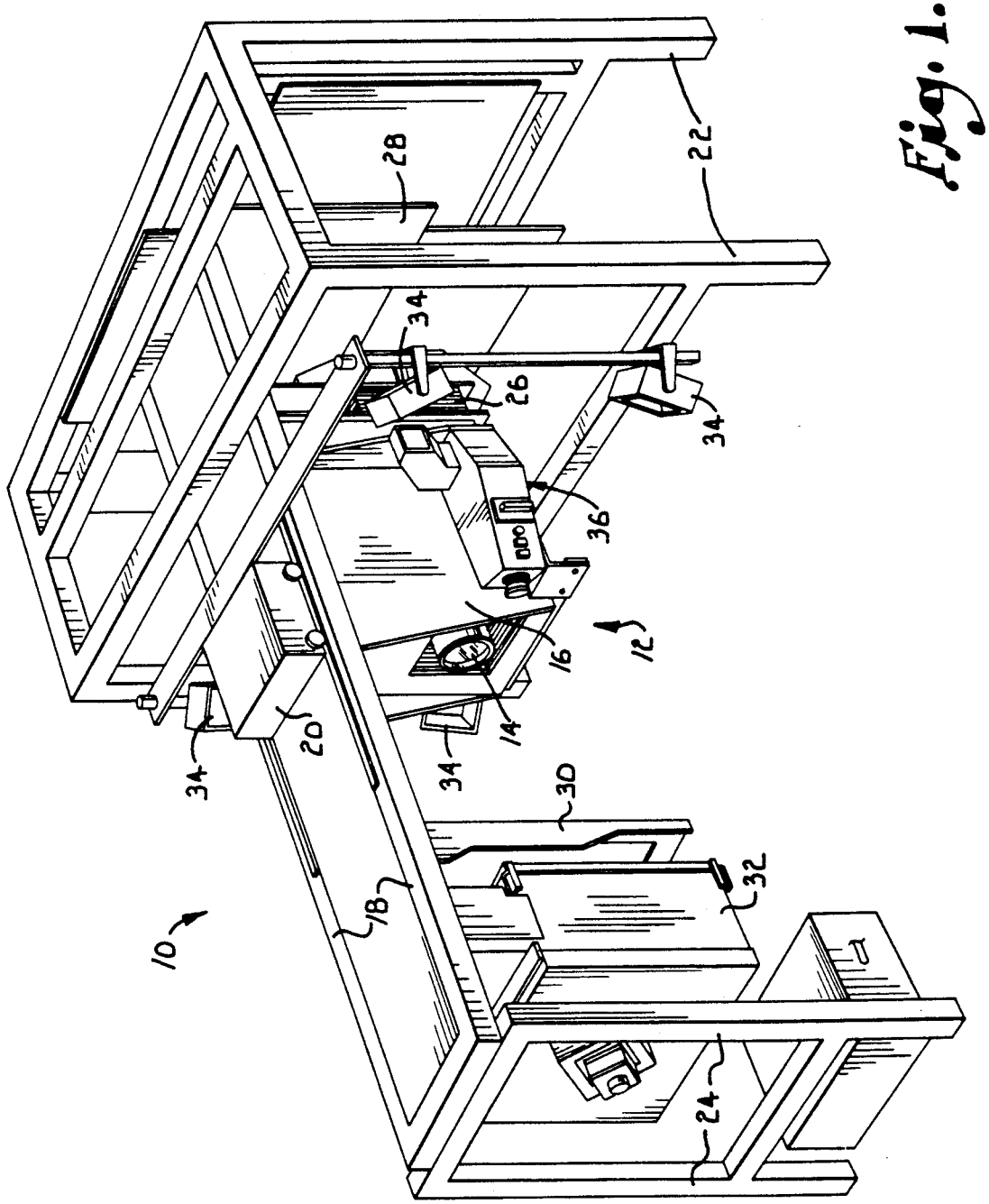
FIG. 1 is a perspective view of a step-and-repeat camera system equipped with an auxiliary camera/projector constructed and arranged according to a preferred embodiment of the present invention.

Referring now to the drawings in more detail and initially to FIG. 1, numeral 10 generally designates a photoreproduction system which includes a step-and-repeat camera 12 of the type disclosed in U.S. Pat. Nos. 3,998,546 and 4,582,406 to Wally. The camera 12 has a lens 14 and a shroud 16 which provides a camera compartment mounted for movement along overhead rails 18. The camera is supported on a carriage 20 which may be moved back and forth along the rails 18. The rails 18 are supported at their forward ends on legs 22 and at their back ends by additional legs 24. The camera 12 includes a bellows 26 and a film holder 28 for holding photosensitive film that is to be exposed to the copy that is being photoreproduced.

The copy which is to be photoreproduced by the camera 12 is held on a subject holder which takes the form of an easel 30 supported on the overhead tracks 18 for back and forth movement thereon. A boxlight 32 is supported on the rails 18 at a location behind the easel 30 in order to provide back lighting in cases where the image on the copy is to be projected through the lens 14. A plurality of front lights 34 are also suspended from the rails 12 to provide front lighting which reflects off of the copy on the easel 30 in cases where the copy is to be photographed.

The present invention relates to a method and apparatus for accurately locating the copy on the easel 30, and the invention makes use of an auxiliary camera/projector which is generally identified by numeral 36 and which is mounted to one side of the shroud 16 as close as possible to the optical axis of the main step-and-repeat camera 12. With additional reference to FIGS. 2-4, the auxiliary camera/projector 36 has an enclosed optical compartment 38 which is formed within side walls 40 and 42, end walls 44 and 46, above a bottom panel 48 and below a removable top panel 50. The top panel 50 fits on an inturned flange 52 extending inwardly from the side and end walls of the optical compartment and is secured in place by quick release fasteners 54.

The components mounted within the optical compartment 38 include a 500 watt quartz-iodine lamp 56 which is mounted on a bracket 58 within a light compartment 60. The light compartment 60 is a box shaped structure and has one wall 62 provided with a square opening 64 (see FIG. 4). Another compartment 66 extends around the light compartment 60 and boxes it in. One wall 68 of the outer compartment 66 is provided with a transparent panel 70 that registers with opening 64. The light which is emitted by the bulb 56 is thus able to pass through opening 64 and panel 70 and reflect from a mirror 72 mounted on the inside surface of wall 32. A potentiometer 74 may be adjusted to control the intensity of the light emitted by the lamp 56.

The light compartment 60 is cooled by an electric fan 76 mounted within a fan shroud 78 at the bottom of the camera/projector 36. As indicated by the directional arrows in FIG. 3, the fan 76 draws ambient air into the bottom of the fan shroud 78 and passes the cooling air through the light compartment 60 and out of the camera/projector 36 through an outlet duct 80 mounted on top of the camera shroud above the lamp compartment 60.

As will be explained more fully, the bulb 56 is energized in the projection mode of the camera/projector 36 and emits high intensity light. The fan 76 circulates cooling air through the optical compartment 60 in order to prevent overheating of the lamp and lamp compartment.

Figure 8:
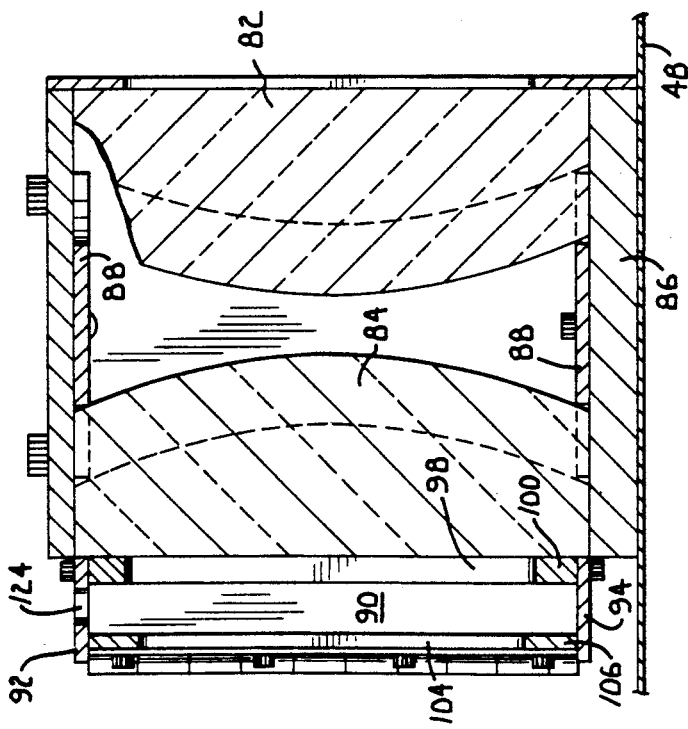
FIG. 8 is a fragmentary sectional view taken generally along line 8—8 of FIG. 6 in the direction of the arrows.

The light which is incident o the mirror 72 reflects off of the mirror and is directed through a pair of condenser lenses 82 and 84 mounted within a lens housing 86 inside of the optical compartment 38. The lenses 82 and 84 have plano exterior surfaces, and two convex interior surfaces opposed to one another a spaced distance apart near the center of the lens housing 86. As best shown in FIG. 8, a pair of contoured plates 88 are secured to the top and bottom inside surfaces of the lens housing 86 and act as spacers to maintain the curved surfaces of the lenses 82 and 84 the proper distance apart.

Figure 10:
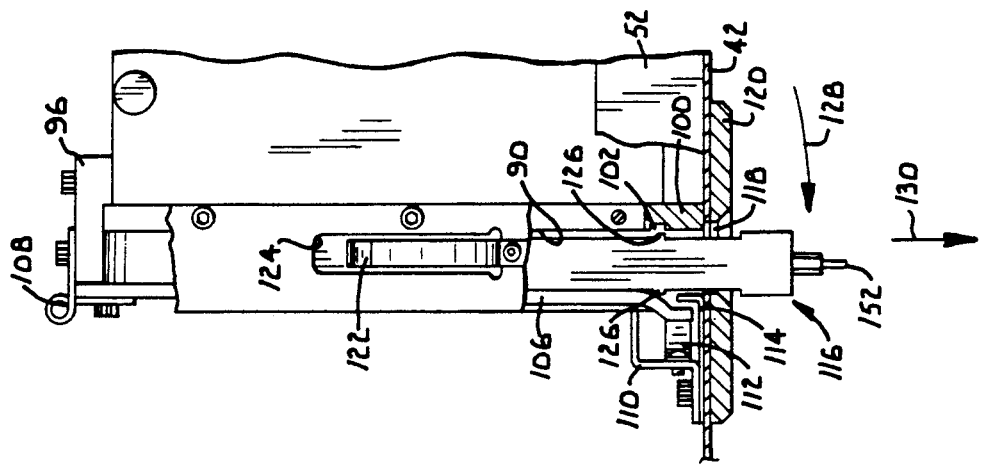
FIG. 10 is a fragmentary top plan view similar to FIG. 9, but showing the film holder released from its latched condition and ready to be removed from the film compartment.
Figure 9:
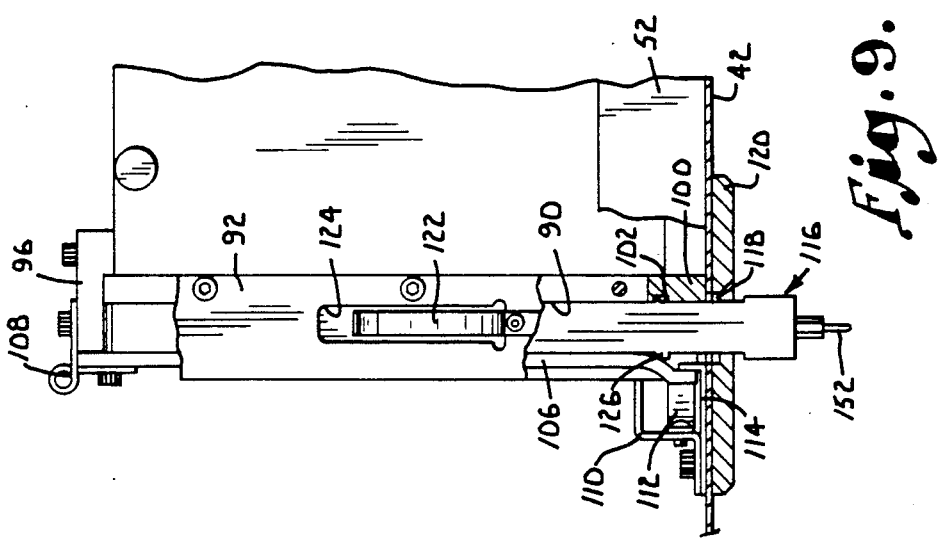
FIG. 9 is a fragmentary top plan view of the film compartment of the camera/projector and showing the film holder fully inserted into the film compartment, with portions broken away for purposes of illustration.

The light which emerges from the lens housing 86 passes through a film compartment 90 and is then directed out of the optical compartment 38 by a conventional lens 91 which is mounted on the end wall 44 and aimed directly at the copy board or easel 30. The lens 91 is focused conventionally by threading its barrel in and out. The film compartment 90 is a relatively thin chamber having top and bottom panels 92 and 94 (see FIG. 8) and an inside end plate 96 (FIG. 9). The light is able to enter the compartment 90 through a rectangular opening 98 formed in a plate 100 located adjacent to the lens housing 86. As shown in FIGS. 9 and 10, the plate 100 is provided with a groove 102 which opens into the compartment 90 near the side wall 42.

The light which is projected through the film compartment 90 passes out of the film compartment through a rectangular window 104 (FIG. 8) formed in a hinged panel 106 on one side of the film compartment. As best shown in FIGS. 9 and 10, the hinged panel 106 is connected at one edge with the end plate 96 by a piano type hinge 10B which permits panel 106 to move in hinged fashion toward and away from the film compartment 90. Opposite the hinged edge of panel 106, a Z-shaped bracket 110 is mounted to the wall 42 with the free edge of the bracket 110 located adjacent to the hinged panel 106. Leaf springs 112 (see also FIG. 5) are secured at one end to bracket 110 near its top and bottom. The opposite ends of the leaf springs 112 act against the free edge of the hinged panel 106 and thus urge the hinged panel continuously toward the film compartment 90. A flanged plate 114 provides a stop which engages the edge of panel 106 to limit its movement toward the film compartment 90.

A film holder which is generally identified by numeral 116 may be inserted into and removed from the film compartment 90 through a slot 118 which is formed through the wall 42 and a thicker plate 120 secured to the outside surface of the wall 42 in registration with the film compartment. As best shown in FIG. 6, a leaf spring 122 is secured at one end to the top panel 92 of the film compartment and projects downwardly into the film compartment through a slot 124 formed in panel 92. When the film holder 116 is inserted into the film compartment through the slot 118, the leaf spring 122 acts against the top edge of the film holder and exerts a frictional force thereon which tends to retain the film holder in place.

The opposite sides of the film holder 116 are provided with projecting beads 126, and when the film holder is fully inserted into the film compartment 90, one of the beads 126 is aligned with the groove 102 in panel 100. The bead 126 then snaps into the groove 102 and is held therein by the force of the leaf springs 112, thus latching the film holder in place in the film compartment in the position shown in FIG. 9. In order to remove the film holder, it is necessary to first slide its exterior end in a direction away from the groove 102 as indicated by the directional arrow 128 in FIG. 10. This removes the bead 126 from the groove 102, and the film holder 116 can then be slid outwardly and withdrawn from the film compartment 90 through the slot 118 in the direction indicated by the arrow 130 in FIG. 10.

The film holder 116 is a thin rectangular structure. With particular reference to FIG. 7, the opposite sides of the film holder are provided with rectangular windows 132 and 134 which allow light to enter and leave the film holder. A central partition 136 is likewise provided with a rectangular window 138 which is somewhat smaller than the windows 132 and 134. The partition 138 is provided with a pair of registration pins 140 (only one of which is visible in FIG. 7). A 4×5 in. cut sheet photosensitive film 142 is held in the film holder 116 adjacent to the partition 136. The film 142 is provided with punched holes that receive the registration pins 140 in order to locate the film 142 properly in the film holder.

Figure 2:
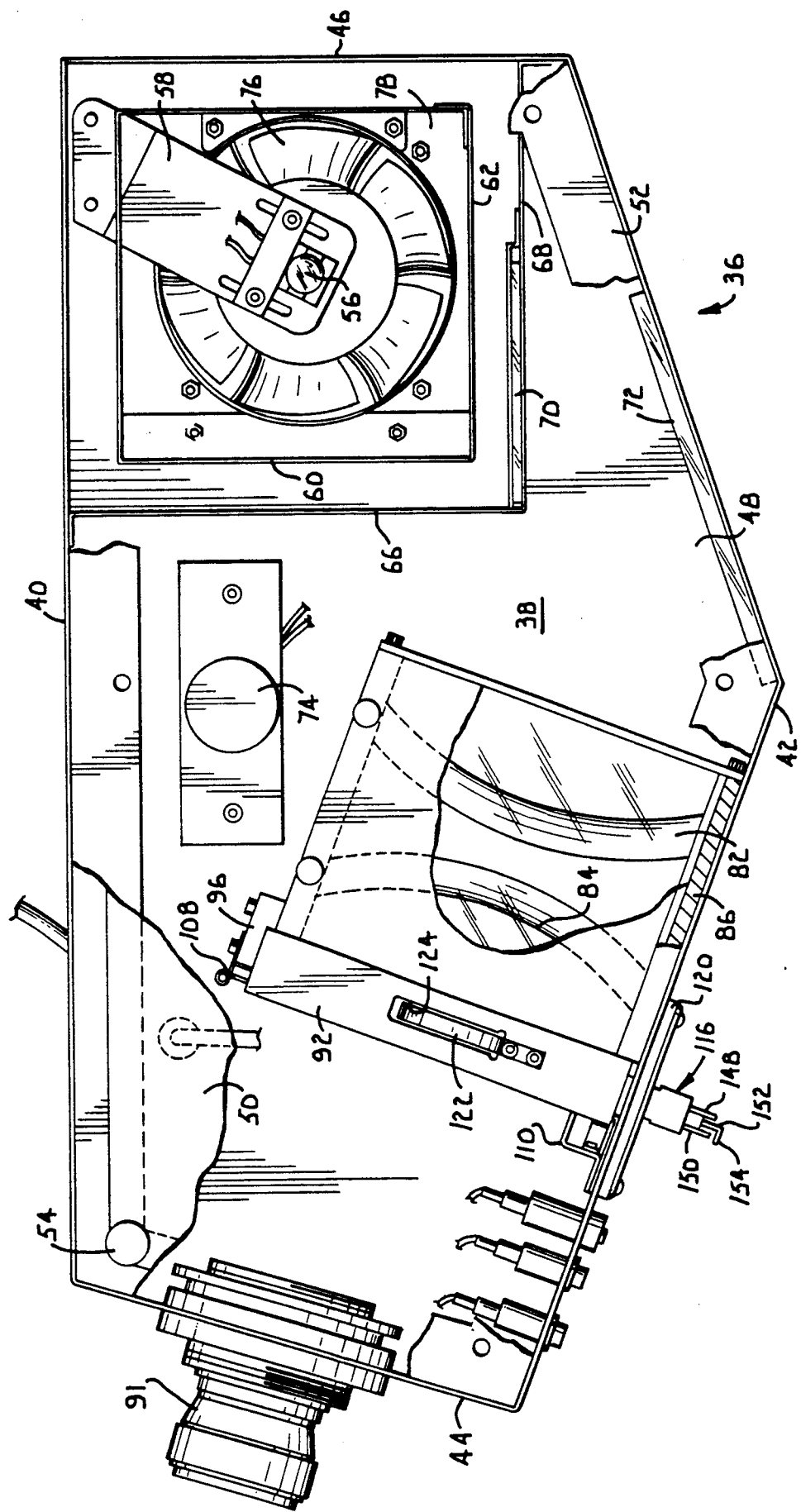
FIG. 2 is top plan view on an enlarged scale of the auxiliary camera/projector shown in FIG. 1, with portions broken away for purposes of illustration.

On opposite sides of the film 142, the film holder is provided with slots 144 and 146 which receive removable opaque panels 148 and 150 (see FIG. 2). The panels 148 and 150 are both rectangular and are large enough to completely cover the windows 132 and 134. Panel 148 is located on the back side of the film 142 or on the side between the lamp 56 and the film. The other panel 150 is located on the front side of the film or between the film and the subject holder.

The opaque panels 148 and 150 slide into and out of the respective slots 144 and 146. As best shown in FIG. 2, the outside end of the film holder 116 is provided with a pair of pivotal rods 152 having bent tips 154. After the opaque panels 148 and 150 have been fully slid into the slots 144 and 146, the rods 152 can be turned such that the tips 154 lie across the edges of the panels as shown for the panel 150 in FIG. 2. This latches the opaque panel in place. When the rod 152 is turned 90°, the tip 154 is released from its latching position and the panel can then be removed from the film holder 116.

In operation, the auxiliary camera/projector 36 facilitates accurate positioning of the copy on the easel 30. As best shown in FIG. 11, the lens 92 is directed such that its optical axis 156 intersects the easel 30 at the same location as the easel is intersected by the optical axis 158 of the main step-and-repeat camera 12. Referring additionally to FIG. 12, a template 160 is accurately punched with a pair of registration holes 162 that register with pins 164 (FIG. 11) on the easel 30 in order to position the template 160 such that lines 166 marked on the template are located to define the borders of the type or other copy which is to be photoreproduced by the camera 12.

The film holder 116 is inserted through slot 118 into the film compartment 90 with unexposed film 142 held on the registration pins 140 of the film holder and with both of the opaque panels 148 and 150 in place in the slots 144 and 146 to maintain the film 142 in a light tight condition. After the film holder is in place in the film compartment, the front panel 150 is slid out of slot 146 so that the film 142 is exposed to the line image 166 on the template 160. The camera/projector 36 is operated in the camera mode in order to expose the film to the template image. Preferably, the lens 90 is stopped down to the minimum size aperture because this makes for maximum depth of focus and brings both the near and far edges of the template line image 166 into sharp focus. Because the auxiliary camera/projector is at a relatively severe angle to the template, focusing of both near and far edges is important in achieving a good image. The front lights 34 of the main camera can be used to expose the film 142, and the computerized control system of the main camera can determine and control the length of exposure. It is noted that the auxiliary camera/projector unit 36 does not need a shutter because the computerized control system can control the length of exposure by controlling the front lights 34.

When exposure of the film 142 is complete, the front slide panel 150 is placed back in its slot 146, and the film holder 116 is removed from the film compartment 90 and taken to a dark room or other processing area. The exposed film is then taped or otherwise secured to a larger piece of carrier film and is processed conventionally in a film processor.

When the film comes out processed and dry, it is placed back in the film holder 116 with its punched openings again fitting on the registration pins 140 to secure the film in the same place in the film holder as it occupied during its exposure to the template image. The back panel 148 is removed from its slot 144, and the film holder 116 with only the film 142 in place is inserted again into the film compartment 90. Because of the registration between the bead 126 and groove 102, the film holder 116 is assured of occupying the same position in the camera/ projector 36 each time it is inserted. Because the registration pins 140 assure that the film is in the same place relative to the film holder 116, the film is assured of being in the same position with respect to the easel 30 as it was when the film was exposed.

The template 160 is removed from the easel 30, and the lamp 56 is energized to operate the camera/projector 36 in the projection mode in which light is projected through the film 142 and onto the easel 30. Preferably, the aperture of the lens 92 is opened to one stop smaller than maximum, as this permits near total passage of source light with sharpening of the focus due to the stopping down of the aperture by one stop. The fan 76 is also energized in order to prevent overheating of the lamp compartment 60.

The light which is projected from the lamp 56 in the projection mode of operation follows the path indicated schematically in FIG. 11. The light emitted by the lamp 56 is preferably incident upon the mirror 72 at an angle of 45° so that the angle A in FIG. 11 is 90°. The light is then bent as it passes through the two lenses 82 and 84. The angle B through which the light is bent as it passes through lens 82 is about 6.2°, while the angle C through which the light is bent as it passes out of the other lens 84 is approximately 6.9°. The light is bent again in the lens 91 through an angle D of approximately 11.1° and then follows the optical axis 156 of the lens 91 until it reaches the easel 30.

It has been found that good results are achieved by using a light path generally as shown in FIG. 11, although other paths can be used. However, it is necessary for the optical axis 156 to intersect the other optical axis 158 at the plane of the copy held on the easel 30.

Because of the angle of the camera/projector 36 relative to the plane of the template 160, the film image produced on the film 142 is distorted and assumes the generally trapezoidal shape indicated at 166a in FIG. 6. However, when light is projected through the distorted image 166a, the film image which is projected onto the easel 30 is restored to the exact shape of the lined image 166 on the template 160. In addition, the lines 166 are at the same locations as the lines on the template, and the image which is projected onto the easel thus provides an accurate indication of the borders for the copy which is to be applied to the easel.

The image which is projected onto the easel provides a visual guide that permits the operator to accurately place the copy on the easel 30 for photoreproduction by the step-and-repeat camera 12. The operator simply places the edges of the type or other feature of the copy properly with respect to the lines 166 which are projected onto the easel 30, and he then operates a foot switch or the like (not shown) to activate the vacuum system of the easel 30 such that the vacuum thereafter holds the copy in the proper position as it is photoreproduced by the camera 12.

The template image that is projected onto the easel 30 is a brilliant image that can be readily identified in the normal room light that is present. Because cut sheet film 142 is used instead of microfilm, more energy can be passed through the film during the projection mode of operation without overheating or otherwise damaging the film. The use of the condenser lenses 82 and 84 also contributes to the sharpness of the projected image, as does the use of a high intensity quartz-iodine lamp 56 which is only slightly dimmed by the potentiometer control 74. Also, a relatively fast F4.5 lens is used on the camera/projector with an aperture in the projection mode which is nearly wide open. The image that is projected is so brilliant that a filter layer may be employed in front of the template, thus rendering the template image in any color which may help to differentiate it from the black on white image of the artwork that is to be photographed.

Although the projected image is brilliant and sharply focused so that the operator is able to easily position the copy using it as a guide, it is nevertheless obscured to the point of being invisible when the front lights 34 are energized during operation of the main step-and-repeat camera 12. Consequently, the projected image of the template has no effect on the appearance of the copy that is photoreproduced by the main step-and-repeat camera.

Figure 14:
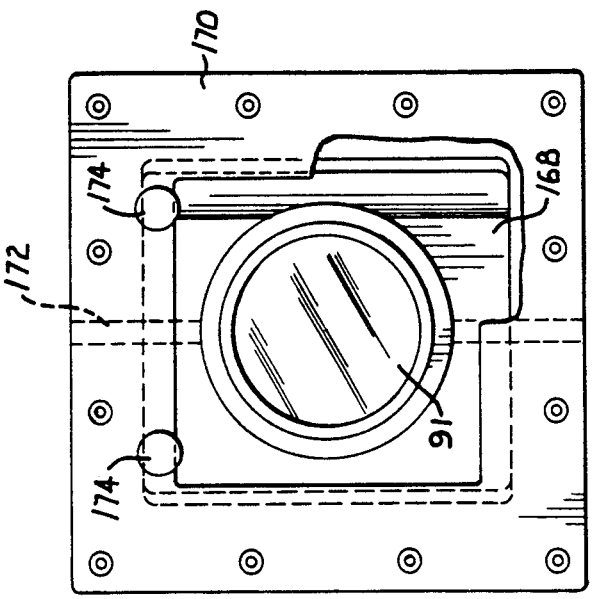
FIG. 14 is a fragmentary elevational view taken generally along line 14—14 of FIG. 13 in the direction of the arrows.
Figure 13:
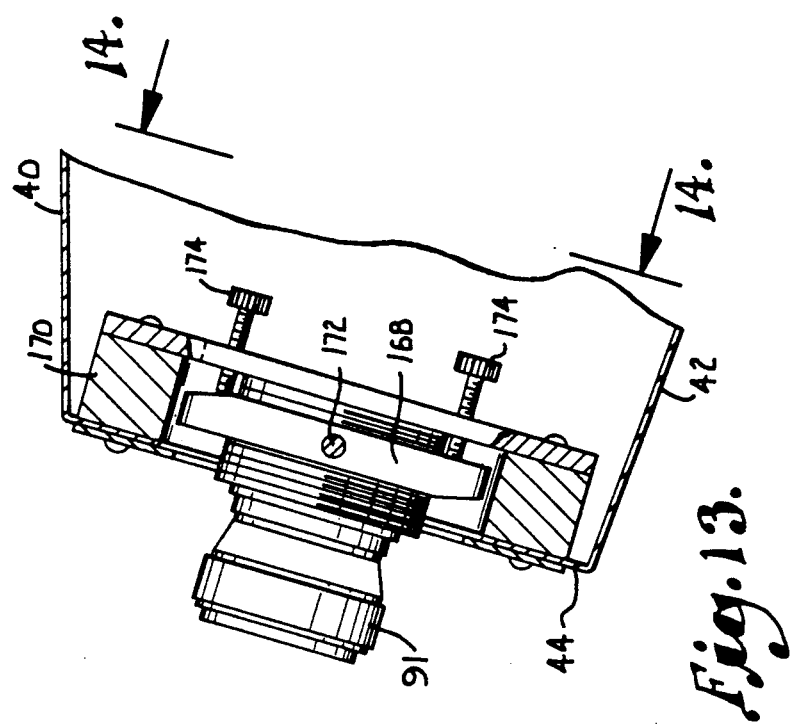
FIG. 13 is a fragmentary sectional view taken on a vertical plane and showing the pivotal mounting and adjustment mechanism that may be employed for the lens of the camera/projector.

FIGS. 13 and 14 depict an arrangement for aiming the lens 91. The lens is mounted on a pivot plate 168 which is mounted on a bracket 170 by a vertical pivot pin 172. The bracket 170 is mounted to the end panel 44 of the camera/projector unit 36, and the lens 91 is thus mounted to pivot about the vertical axis of the pin 172.

Adjustment of the pivotal position of the plate 168 is effected by a pair of adjustment screws 174 which are threaded through the bracket 170 with their tips contacting the inside surface of plate 168 on opposite sides of the pivot pin 172. By threading one of the screws 174 inwardly and unthreading the other screw 174, the pivotal position of the plate 168 may be adjusted, and this in turn adjusts the direction in which the lens 91 is aimed. By this arrangement, the lens 91 can be adjusted in its aim as necessary to either receive the template image in the camera mode or direct the image being enlarged to the proper location on the easel 30 in the projection mode.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, we claim:

1. A method of accurately positioning copy on a subject holder for photographing of the copy by a main camera, said method the steps of:
   providing an auxiliary camera/projector having a camera mode of operation and a projection mode of operation;
   mounting a template on the subject holder at a preselected position indicative of the position the copy is to occupy during photographing thereof;
   photographing said template with said auxiliary camera/projector in the camera mode to obtain a film image of the template;
   using said auxiliary camera/projector in the projection mode to project said film image of the template onto said subject holder at said preselected position; and
   applying the copy to the subject holder using the projected image of the template as a guide indicating the position the copy is to occupy.

2. The method of claim 1, including the step of maintaining said auxiliary camera/projector at a fixed position relative to the main camera.

3. The method of claim 2, wherein:
   said photographing step comprises loading photosensitive film in said auxiliary camera/projector at a preselected location therein, exposing said film to the template and processing the exposed film to obtain said film image thereon; and
   said using step comprises loading the processed film with said film image thereon in said auxiliary camera/projector at said preselected location therein and projecting light onto the subject holder through the processed film in the camera/projector.

4. The method of claim 3, wherein:
   said step of loading photosensitive film comprises loading the film in a film holder having a predetermined location for the film and removable opaque panels in front of and behind said predetermined location and then loading said film holder onto the camera/projector at a selected position; and
   said step of exposing said film comprises removing the panel in front of said predetermined location and exposing the film to the template.

5. The method of claim 4, wherein:
   said step of loading the processed film comprises loading the processed film into said film holder and loading the film holder into the camera/projector; and
   said step of projecting light comprises projecting light through the processed film in the film holder with both of said panels removed.

6. A method of photographing copy comprising the steps
   providing a subject holder for holding the copy at a preselected location;
   providing a main camera;
   providing adjacent to said main camera an auxiliary camera/projector operable in camera and projection modes;
   mounting a template on the subject holder at said preselected location;
   photographing said template with the auxiliary camera/projector in the camera mode to obtain a film image of the template;
   using the auxiliary camera/projector in the projection mode to project said film image onto the subject holder at said preselected location;
   applying the copy to the subject holder using the projected film image of the template as a guide for positioning the copy at said preselected location; and
   using the main camera to photograph the copy on the subject holder.

7. The method of claim 6, wherein said step of using the main camera comprises lighting the copy on the subject holder to optically obscure the projected film image of the template while the copy is being photographed.

8. Apparatus for facilitating accurate positioning of copy on a subject holder for photographing of the copy by a main camera, said apparatus comprising:
   an auxiliary camera/projector having camera and projection modes of operation and means for receiving and holding a film holder at a fixed position in the camera/projector;
   means for mounting said camera/projector at a stationary position adjacent the main camera;
   a template having markings thereon;
   means for mounting said template on the subject holder at a preselected position wherein said markings are indicative of the position to be occupied by the copy during photography thereof;
   means for operating said auxiliary camera/projector in the camera mode to obtain a film image of the template on photosensitive film in the film holder; and
   means for operating said auxiliary camera/projector in the projection mode to project the film image from the film in the film holder onto said subject holder at said preselected position, whereby the projected film image provides a visual guide for positioning of the copy on the subject holder.

9. Apparatus as set forth in claim 8, wherein said film holder comprises:
   means for locating the film at a predetermined location in the film holder; and
   a pair of removable opaque panels applicable to the film holder at locations in front of and behind said predetermined location to permit the film to be maintained light tight with both panels in the film holder, to be exposed to the template in the camera mode with only the panel in front removed, and to be projected through in the projection mode with both panels removed.

10. In a photoreproduction system having a subject holder for receiving and holding copy, means for lighting the copy and a main camera for photographing the copy, the improvement comprising:
   an auxiliary camera/projector having camera and projection modes of operation, said camera/projector being mounted on said main camera;
   a template applicable to the subject holder at a preselected location wherein the template is indicative of the position to be occupied by the cop during photography thereof by the main camera;
   a film holder adapted to hold photosensitive film and fitting releasably in the auxiliary camera/projector at a predetermined position therein;
   means for operating the camera/projector in the camera mode with film in the holder to obtain a film image of the template;
   means for operating the camera/projector in the projector mode with the exposed film in the holder to project the film image of the template onto the subject holder at said preselected location, whereby the projected image provides a guide for positioning the copy on the subject holder.

11. The improvement of claim 10, wherein said film holder
- means for locating the film at a predetermined location in the film holder; and
- a pair of removable opaque panels applicable to the film holder at locations in front of and behind said predetermined location to permit the film to be maintained light tight with both panels in the film holder, to be exposed to the template in the camera mode with only the panel in front removed, and to be projected through in the projection mode with both panels removed.

* * * * *